Feb. 3, 1970  H. GEIPEL ET AL  3,492,740
FLUIDIZED BED
Filed Jan. 25, 1968
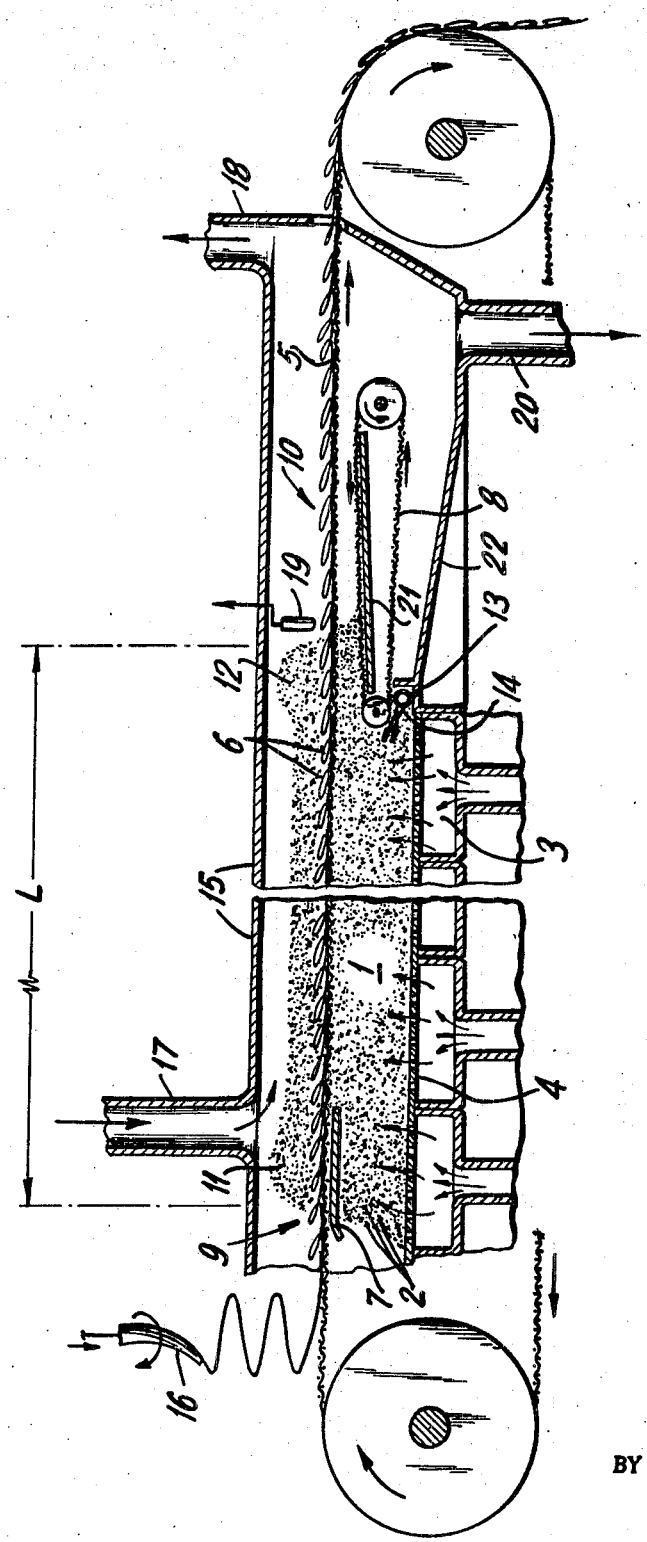
INVENTORS:
HANS GEIPEL
ECKEHARD FÖRSTER
WILFRIED HEINEMANN
BY
Karl F. Ross
ATTORNEY United States Patent Office 3,492,740
Patented Feb. 3, 1970

3,492,740
FLUIDIZED BED
Hans Geipel, Oberhausen-Sterkrade, Eckehard Forster, Oberhausen, and Wilfried Heinemann, Duisburg-Hamborn, Germany, assignors to Firma Huttenwerk Oberhausen AG, Oberhausen, Germany, a corporation of Germany
Continuation-in-part of application Ser. No. 675,426, Oct. 16, 1967. This application Jan. 25, 1968, Ser. No. 729,833
Claims priority, application Germany, Jan. 26, 1967, H 61,675
Int. Cl. F26b 17/04
U.S. Cl. 34—57    5 Claims

ABSTRACT OF THE DISCLOSURE

In a plant for the heat treatment of workpieces on a continuously moving apertured conveyor, the latter is surrounded by a fluidized bed of solid ceramic particles entrained by a stream of carrier gas within a tunnel whose discharge end contains a second, oppositely moving conveyor underneath the first one to stop the outward movement of solid particles and accumulate them in a nearly stationary pile traversed by the emerging workpieces; escape of particles underneath the second conveyor is prevented by gas blown into the tunnel from a transverse pipe.

---

This application is a continuation-in-part of our copending application Ser. No. 675,426 filed Oct. 16, 1967, now abandoned.

Our present invention relates to a fluidized bed for the heat treatment of workpieces, particularly but not exclusively the cooling of steel wire which is to be patented (i.e. cooled at a controlled rate) for transformation from its austenitic state to a sorbitic pearlite structure as more fully disclosed in our commonly owned application Ser. No. 675,522 filed Oct. 16, 1967.

The term "fluidized bed" denotes a mass of solid particles, such as ceramic granules, entrained by a stream of carrier gas. The particles, which should have an elevated heat-transfer coefficient, serve as the principal constituent of the cooling medium whereas the carrier gas plays only a minor role in the maintenance of the desired discharge temperature. This gas is also used as a vehicle for a continuous recirculation of the particles, generally in the direction of conveyor motion, through a cooling tunnel and through an external cooling chamber where the heat abstracted from the workpieces (e.g. a succession of wire loops) is removed. For most effective heat transfer it is desirable to let these particles accumulate in a nearly stationary pile at the exit end of the tunnel and, preferably, also at the entrance end. At the same time, for reasons of economy as well as accurate control of the exit temperature, any escape of particles together with the emerging workpieces should be suppressed or at least minimized; thus, in the wire-patenting process of our aforementioned copending application it is essential to complete the transformation under substantially isothermic conditions, in the absence of a cooling medium other than the surrounding atmosphere, so that all contact with accompanying solid particles should be positively terminated as soon as the workpieces leave the bed.

The general object of our present invention is to provide a fluidized bed satisfying this requirement for the aforestated purpose and for other types of heat treatment, a term intended to encompass exposure to any contacting medium maintained at a predetermined temperature.

This object is realized, pursuant to our present invention, by the provision of two conveyors within the tunnel, i.e. a principal conveyor which is apertured to facilitate the circulation of heating or cooling medium around the workpieces carried thereon and which extends within the tunnel past the exit end thereof for discharging the heat-treated workpieces, and a secondary conveyor located just below the principal conveyor at the exit end, this secondary conveyor moving in a direction opposite that of the principal conveyor so as to arrest outwardly traveling particles which thereby pile up ahead of the tunnel exit.

Advantageously, pursuant to another feature of our invention, the second conveyor is also apertured and overlies a stationary plate in which the pile of accumulated particles comes to rest. A similar stationary plate may be provided underneath the main conveyor at the entrance end of the tunnel or some other location remote from its exit where the recirculated treatment agent enters the flow channel.

The invention will be described in greater detail with reference to the accompanying drawing, the sole figure of which is a diagrammatic side-elevational sectional view of a fluidized bed for the cooling of wire in accordance with a preferred embodiment.

The bed 1 shown in the drawing consists, essentially, of a mass of solid particles (e.g. of magnesia) 2 entrained by a stream of gas which flows toward the discharge end 10 of a tunnel 15 traversed by an apertured principal conveyor 5 in the form of an endless belt such as a wire screen or a set of parallel wires. Workpieces 6, i.e. a succession of interconnected loops of steel wire, are deposited on conveyors 5 near the tunnel entrance by a dispenser generally indicated as 16. This dispenser comprises a rotating tubular arm through which the hot steel wire passes so as to be formed into loops by the arm's rotation; more elaborate types of loop formers are known, for example, from U.S. Patent Nos. 3,056,433 and Re. 26,052. The dispenser 16 may oscillate transversely with reference to conveyor 5, in the manner disclosed in our commonly owned application Ser. No. 675,405, filed Oct. 16, 1967, for the purpose of spreading the loops most effectively over the available conveyor surface.

A stream of relatively inert carrier gas, e.g. hydrogen or carbon monoxide, is continuously recirculated through the tunnel 15 by way of an entrance pipe 17 near the dispenser 16 and an exhaust pipe 18 at the exit end 10. A stationary imperforate support plate 7 underlies the upper run of belt 5 just below the inlet 17 so that solid particles entrained by the carrier gas tend to accumulate as shown at 11. Additional gas is admitted via a manifold 3 at a controlled rate through a perforated base 4 on which the particles 2 come to rest. The particles exhausted through outlet 18 and through a further exit port 20 are returned to the inlet 17 after passing through a cooling chamber not shown; reference is made to our copending application Ser. No. 675,522 for additional details of a plant of which the illustrated arrangement forms a part.

Conveyor 5 rotates continuously so that its upper run carries the workpieces 6, accompanied by some of the solid particles 2 of the fluidized bed 1, from the entrance end 9 toward the exit 10 of tunnel 15, i.e. from left to right as viewed in the drawing. A secondary conveyor 8, whose upper run rotates in the opposite direction (i.e. from right to left), is disposed at the exit end 10 beneath the upper run of principal conveyor 5 and moves at such a speed as substantially to arrest the outflowing particles which thereby accumulate in a pile 12. Conveyor 8 is also apertured and underlain by a stationary imperforate plate 21 supporting the pile 12. Owing to the reverse motion of secondary conveyor 8, virtually no particles 2 will leave the tunnel 15 together with the workpieces 6 which, on emerging from the pile 12, undergo no further forced cooling up to their discharge from the conveyor.

The terminal portion of tunnel 15, beyond pile 12, thus may serve for the completion of the austenitic pearlite transformation, under substantially isothermic conditions with inhibition of outward heat radiation by the thermally reflecting tunnel walls, to prevent the formation of bainite as more fully described in the copending application last referred to. As also described there, the temperature of the particles 2 and/or the speed of conveyor 5 may be regulated to maintain the desired exit temperature for the workpieces, e.g. by means of a temperature sensor 19 disposed near the exit pile 12; changing the conveyor speed varies the residence time of the wire 6 within the fluidized bed 1 which has a well defined length L.

In order to minimize the escape of particles 2 between the lower tunnel wall and the lower run of conveyor 8, a conduit 13 is transversely positioned in the gap therebetween and is provided with nozzles 14 for the discharge of carrier gas in a forward direction. If, nevertheless, solid particles move past the blower 13 underneath conveyor 8, they are guided by a chute 22 toward the discharge port 20.

Whereas in the system of our copending application Ser. No. 675,405 the conveyor is shown downwardly inclined toward the exit end of the tunnel, the provision of a moving secondary conveyor instead of a stationary shutter as an exit gate enables the positioning of the principal conveyor in a horizontal plane, or even with an upward slope as shown.

We claim:

1. A fluidized bed for the heat treatment of workpieces, comprising an elongated tunnel, a unidirectionally movable apertured principal conveyor extending within said tunnel past an exit end thereof for discharging treated workpieces, dispenser means at an entrance end of said tunnel for depositing workpieces to be treated on said principal conveyor, circulation means for blowing a treatment agent through said tunnel into heat-exchanging contact with said workpieces, said treatment agent consisting of a gas stream with entrained solid pariclces, and a secondary conveyor in the form of an endless band having an upper run just below said principal conveyor at said exit and movable in the opposite direction out of contact with said workpieces for arresting outwardly traveling particles and accumulating same in a pile within said tunnel.

2. A fluidized bed as defined in claim 1 wherein said endless band is apertured, further comprising a stationary support plate for said particles immediately below said band.

3. A fluidized bed as defined in claim 1 wherein said endless band has a lower run forming a small gap with the bottom of said tunnel, further comprising nozzle means within said gap for discharging a gas forwardly into said tunnel to prevent the escape of particles through said gap.

4. A fluidized bed as defined in claim 1 wherein said circulation means includes an inlet to said tunnel remote from said exit end and above said principal conveyor, further comprising a stationary support plate just below said principal conveyor in the region of said inlet.

5. A fluidized bed as defined in claim 1 wherein said principal conveyor is upwardly inclined toward said exit end.

References Cited
UNITED STATES PATENTS

| | | | |
|---|---|---|---|
| 2,832,709 | 5/1958 | Sendzimir | 266—3 X |
| 3,390,871 | 7/1968 | McLean et al. | 266—3 |
| 3,391,915 | 7/1968 | Morgan | 263—3 |

JOHN J. CAMBY, Primary Examiner

U.S. Cl. X.R.

165—104; 263—40